Nov. 13, 1934.  H. B. LINDSAY  1,980,213
RADIATION DIFFERENTIAL THERMOMETER
Filed Jan. 18, 1933
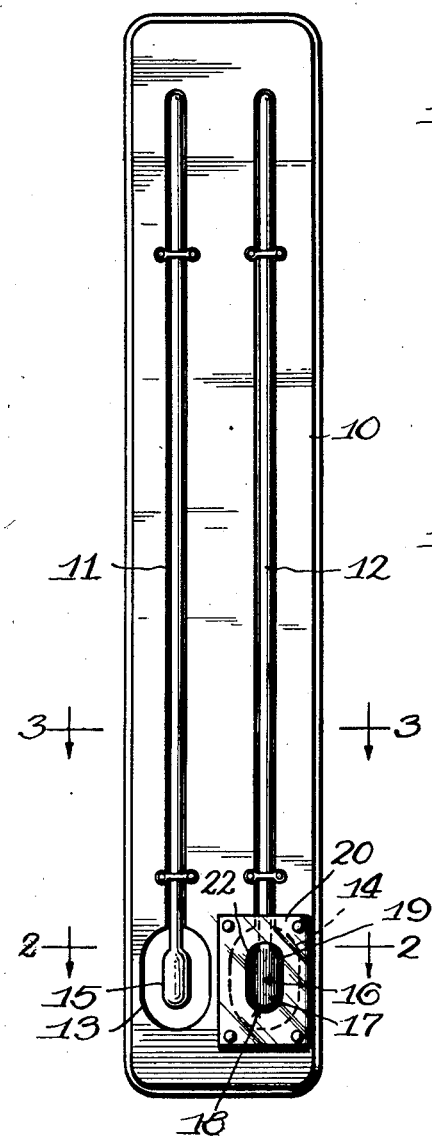
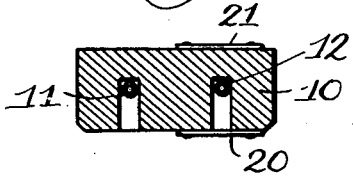
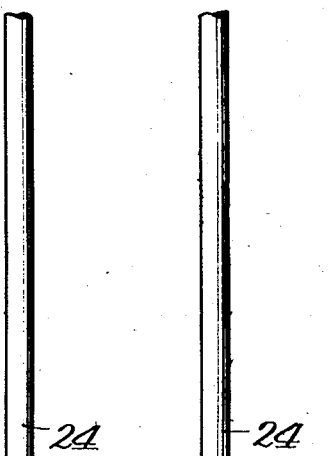
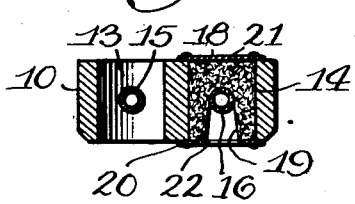
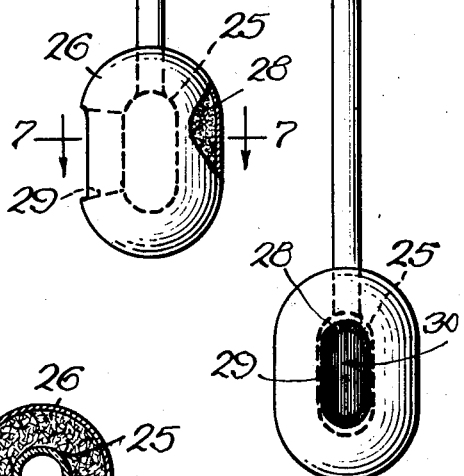
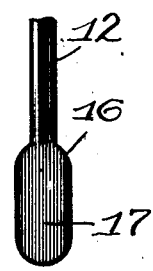
Inventor
Harvey B. Lindsay Patented Nov. 13, 1934

1,980,213

UNITED STATES PATENT OFFICE 1,980,213

RADIATION DIFFERENTIAL THERMOMETER

Harvey B. Lindsay, Chicago, Ill.

Application January 18, 1933, Serial No. 652,320

5 Claims. (Cl. 73—52)

The invention relates to devices for measuring temperature, and has as one of its principal objects the provision of a device of this character having means whereby temperature influences or the heat impact of radiated heat may be more accurately measured.

It is an object of this invention to provide a heat measuring device which will competently measure the resultant temperatures from radiated heat impacts in addition to ambient conductive heat impacts, as for example the total heat impact received by an object in sunlight or exposed to radiation from another object of higher temperature than the ambient air.

It is also a purpose of the invention to provide a device of the character referred to having means to compare simultaneously the resultant temperatures from heat energy impacts comprising a proportion of radiated energy, as heretofore generally measured, and as measured by the non-re-radiating device hereinafter described.

A further object of the invention is to provide a device of the character above referred to in combination with means also to prevent the access of the radiated heat to the thermal-responsive element of said device while allowing the ambient conductive heat such access, thereby rendering computative the radiated heat impact alone.

A further object is to provide such a device as last named with means rendering the absorption and measuring of both the radiated and conductive heat, or the conductive heat only, readily selective by the operator of the device.

Another object of the invention is to provide a device of the character referred to, capable of measuring the radiated and conductive heat impacts as described, in a simple and portable form and a form more practically useful than the delicate or complex instruments known as radiometers and radiomicrometers.

A further object of this invention is to disclose a method of measuring heat as above described which can be readily applied to thermometers, thermoscopes, thermocouples, thermostatic devices, thermal control devices, and all other such thermal measuring or controlling devices having thermal-responsive elements or parts.

The invention has as a further object the employment of means for accomplishing the several above enumerated objects and the arrangement of said means in the above mentioned and other combinations.

The invention has these and other objects, all of which will be explained in detail and more readily understood when read in conjunction with the accompanying drawing which illustrates various embodiments of which the invention is susceptible, it being, therefore, manifest that changes and modifications may be resorted to without departing from the spirit of the appended claims forming a part hereof.

In the drawing:

Figure 1 is a front elevation of a device embodying the invention, the same being combined with an ordinary thermometer to thus provide a comparative temperature indicating instrument.

Figure 2 is a section taken on line 2—2 of Figure 1.

Figure 3 is a section taken on line 3—3 of Figure 1.

Figure 4 is a view in elevation of a fragment of the tube employed in the structure shown in Figure 1.

Figure 5 is a side elevation of a modified arrangement which may be resorted to.

Figure 6 is a front view of the structure shown in Figure 5.

Figure 7 is a section taken on line 7—7 of Figure 5.

The invention is illustrated in the drawing as combined with an ordinary thermometer. However, it is manifest that the invention is not limited in its use to a device employing a liquid temperature-responsive medium and a tube in which this medium is confined, as the invention is capable of use in connection with thermoscopes, thermocouples, thermostatic devices and other temperature-responsive and measuring devices involving a structure other than said tube and liquid temperature-responsive medium.

The device illustrated in the drawing involves the use of a board or back 10 which provides a support for the ordinary thermometer bulb and stem 11, and in addition provides a support for the bulb and stem 12 which is employed in this instance to assist in describing the invention. The board or support 10 is provided with openings respectively designated 13 and 14 in which the bulb ends, respectively designated 15 and 16, of the respective tubes 11 and 12, are located. It is, of course, understood that these tubes confine a thermal-responsive medium such as mercury or alcohol and are graduated for measuring temperature.

As before stated, it is an object of the invention to provide means for absorbing both conductive and radiated heat and for preventing re-radiation or emissivity of heat transmitted to said thermal-responsive means. To these ends, the bulb 16 of the tube 12 is coated with any suitable absorbent material designated 17, which will assist heat to be transmitted to the thermal-responsive medium contained in the tube. For the purpose of preventing re-radiation or emissivity of such heat, as before stated, the bulb end 16 of the tube 12 is located in the opening 14 provided in the board or support 10, and is provided with means to prevent the dissipation of the heat transmitted to the thermal-responsive medium contained in the tube. This second mentioned means is designated 18 and may be of any suitable heat-insulating material, or vacuum insulating means may be used.

The material 18 is inserted in the opening 14 and is disposed relatively to the bulb of the tubular element 12 to surround the major portion of the circumference of the bulb and to extend lengthwise of said bulb. The said material is provided with a channel or opening 19 which opens from the bulb 16 to the outer air. When the device is positioned with said channel facing the direction of a source of radiated heat, it will thus expose a portion of the bulb to the action of the heat rays as well as the ambient air, the combined temperature of which heat impacts it is desired to measure and determine. The opening 14 in the board or support 10 is provided with closures respectively designated 20 and 21, which are suitably secured to the board or mounting 10 and are employed in this particular structure to hold the insulating material 18 against displacement within the opening 14. The closure member 20 is provided with a slotted opening 22 which registers with the channel or opening 19 formed in the insulating material 18. These closures 20 and 21 are formed of material which is preferably of low heat conductivity, and in addition is preferably of a heat reflective character which will thus cooperate with other elements of the device to result in the production of an instrument capable of greater accuracy of measurement of the temperature influence or the heat impact of radiated heat transmitted to the thermal-responsive medium contained within the bulb 16, when positioned for that purpose, and exclude the radiated heat when positioned to measure only the ambient air (conductive) temperature. It is believed evident that since the bulb end of the tube 12 is coated or otherwise provided with heat-absorbing surface, and that this end of said tube also is insulated against the dissipation of heat from said tube, that all of the heat rays entering the bulb of the tube will be confined therein, as no re-radiation can take place back through said channel toward the source of radiated heat, and will thus act upon the thermal-responsive medium so that an accurate gauge of the temperature of said heat impact or influences may be had. It being understood that by using insulation and closures of known heat conductivity, so that any heat loss from said bulb and, consequently, from the thermal expansive means can be accurately computed, the actual heat impact can be measured with accuracy.

The structure shown in Figures 5 to 7 illustrates another embodiment of the invention and contemplates the utilization of a thermal-responsive medium having means combined therewith for absorbing radiated heat from a given direction, as well as the conductive heat of the ambient air, and preventing its reradiation, the thermal-responsive medium being also insulated against the dissipation of heat, the insulation having a sheath or covering preferably of high heat-reflective character.

This structure contemplates the use of a tube or thermometer stem 24 having a bulbular end 25 which provides means in which a thermal-responsive medium is confined, and from which it is caused by absorbed heat to be expanded into the tube. The bulbular end of the stem 24 is confined in a housing 26 which is preferably of some highly reflective heat-insulating material, in which the insulating material 28 is located. This insulating material entirely surrounds the bulb except that it is provided with an opening 29 which exposes a portion of the surface of the bulbular end of the stem 24, and will thus subject this portion of the bulb to the influences of radiated as well as conductive heat impacting the same. It is understood that this bulbular end is also preferably coated or otherwise provided with a suitable heat absorbent material designated 30. Thus this construction embodies a combination of elements which reflect the heat impacting from all directions but one, readily absorb the heat from one direction, and insulate the thermal-responsive medium contained in the tube to thus prevent the escape or dissipation of heat transmitted to the thermal-responsive material and thus more effectively influence the thermal-responsive medium and result in accurately gauging the heat applied.

From the foregoing description of the invention, it is believed manifest that a device for measuring heat is provided having a thermal-responsive means susceptible to absorption of radiated and conductive heat and means combined therewith for insulating the thermal-responsive medium against the dissipation of heat therefrom, and in addition has selective means preventing access of radiated heat to said thermal-responsive means. It is further believed manifest that the device used in one position relative to a source of radiated heat has means for absorbing and measuring both the heat radiated from that source and the heat of the ambient air, and in a reverse position has means for measuring only the said air heat combined with means for preventing the thermal-responsive means being affected by said radiated heat.

As an illustration of the usefulness of this invention, an example of its use, in an ordinary form is given:

It is desired to ascertain the actual heat impact on furniture when in the beam of an ordinary electric reflector heater, and how much greater it is than had been assumed from test with an ordinary mercury therermometer.

In this experiment the present invention was used in the form of three mercury thermometers—one exposed bright bulb, one exposed black bulb and one black bulb insulated as described above, with the channel through the insulation facing the heater. The respective temperatures registered were 120° F., 137° F., and 213° F. When the insulated thermometer was reversed, thus shielding the bulb from the radiated heat, it registered 78° F.

Having thus explained the invention, what I claim and desire to cover by Letters Patent is:

1. In a device for measuring heat, the combination of a member having a bulb, thermal-responsive means provided therein, said bulb having a limited portion thereof exposed to the influences of heat from one direction, means on the exposed surface of said bulb for absorbing heat effective thereon, and means providing insulation completely surrounding the remainder of said bulb.

2. In a device for measuring heat, the combination of a member having a bulb, thermal-responsive means provided therein, said bulb having a portion thereof exposed to the influences of heat from one direction and means providing insulation completely surrounding the remainder of said bulb, said insulation having a heat-reflecting surface.

3. In a device for measuring heat, the combination of a thermal responsive device, insulating means enclosing said device to prevent dissipation of heat therefrom, said insulating means having a limited opening permitting exposure of said device to heat in one direction, and heat-absorbing means covering the exposed surface of said device.

4. In a device for measuring heat, the combination of a thermal responsive device, insulating means enclosing said device to prevent dissipation of heat therefrom, said insulating means having a limited opening permitting exposure of said device to heat in one direction, heat absorbing means covering the exposed surface of said device, and said insulating means having a heat-reflecting outer surface.

5. In a device for measuring heat, the combination of a thermal responsive device, insulating means completely enclosing said device excepting for a limited opening permitting exposure of said device to radiant heat confined in substantially parallel rays, heat absorbing means covering the exposed surface of said device, and heat reflecting means on the outer surface of said insulating means.

HARVEY B. LINDSAY.